July 22, 1952        A. A. HOBBS        2,604,340
CLAMP FOR SCAFFOLDING TUBES AND LIKE MEMBERS
Filed June 12, 1947
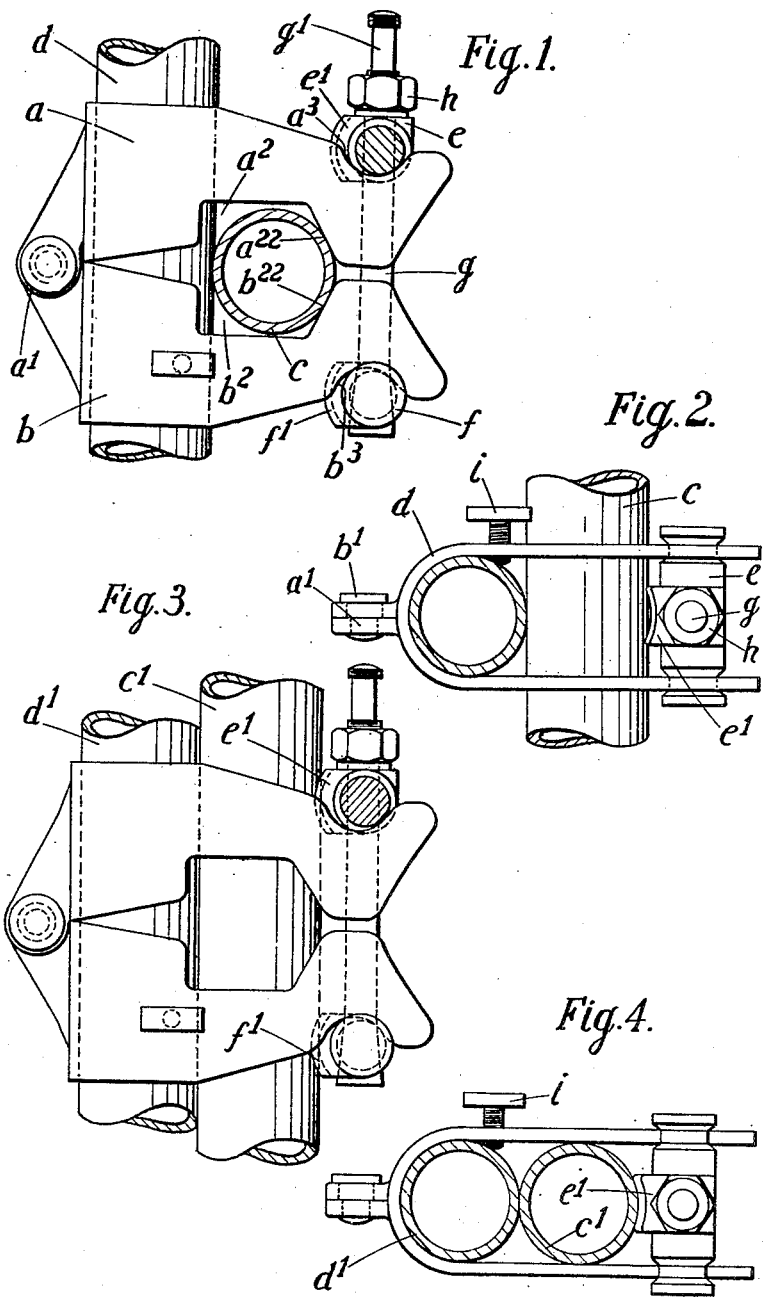
Inventor
A. A. Hobbs Patented July 22, 1952

2,604,340

UNITED STATES PATENT OFFICE 2,604,340

CLAMP FOR SCAFFOLDING TUBES AND LIKE MEMBERS

Archibald Alfred Hobbs, London, England, assignor to Acrow (Engineers) Limited, London, England Application June 12, 1947, Serial No. 754,240
In Great Britain October 16, 1945

Section 1, Public Law 690, August 8, 1946
Patent expires October 16, 1965

4 Claims. (Cl. 287—54)

This invention relates to clamps for scaffolding tubes and like cylindrical members (herein covered by the generic term "tubes") of the kind designed particularly to clamp two tubes at right angles to one another.

Hitherto two general types of clamp for the purpose have been used and both suffer from certain disadvantages. The more common type consists of two individual clamps set at right angles to one another, one receiving the vertical tube and the other the horizontal tube and the tubes being tightened in their individual clamps by set screws, nut and bolt, cams, wedges or other means. It is found, however, that no matter how securely each individual clamp is fastened on to its respective member there is necessarily a constant slight movement all round the axis of the joint due to the necessary free play on the hinge pin of each clamp and this play is multiplied by the number of couplers in use. Moreover, there is always the possibility of one clamp being insufficiently tightened.

In a second type of known coupler there is a solid band shaped to receive the vertical tube with insets for the horizontal tube, the coupler being tightened by pressure of a screw against the horizontal tube. This type suffers from two disadvantages, namely, the limited area of contact of the pressure screw makes it difficult to secure a tight clamping action with the necessary immobility of the parts, and, furthermore, the pressure screw tends to penetrate the horizontal tube to some degree both damaging the tube and causing the loss of some of the pressure applied.

The object of the present invention is to devise an improved form of clamp which will hold both tubes securely in place by clamping pressure applied to both but without the disadvantages of the known types.

The invention consists in a clamp for securing two tubes together comprising two members hinged together and each consisting of a U-shaped member, and a clamping bolt or like means for drawing the limbs of the two members together, the bolt or the like being disposed on that side of the two tubes remote from the hinge or pivotal connection between the members.

The invention also consists in a clamp according to the preceding paragraph in which the limbs of the two U-shaped members are formed with cam shaped recesses adapted to grip one tube and to force the two tubes into contact as the clamp is tightened up.

The accompanying drawings illustrate one form of clamp in accordance with the invention.

Figure 1 is a side elevation showing the clamp in use with two tubes at right angles.

Figure 2 is a plan of Figure 1.

Figures 3 and 4 are similar views to Figures 1 and 2 but showing the clamp in use with two parallel tubes.

In carrying my invention into effect in one convenient manner I form my improved clamp from two U-shaped members $a$ $b$ hinged together at their closed ends by means of flanges $a'$ $b'$ thereon or otherwise and so that when the clamp is tightened into position the bends and limbs of the U-shaped members will be in alignment as shown in Figures 1 and 2. Each limb of each U-shaped member is formed at its inner side with a recess $a^2$ $b^2$ so that the clamp may accommodate a horizontal tube $c$ arranged in the recesses, such tube abutting a vertical tube $d$ which is disposed in the bends of the U. On the outer side of each limb I form a depression $a^3$ $b^3$ adapted to take pins $e$ $f$ through which a clamping bolt $g$ can be passed, the bolt, if desired, being rigidly secured to one pin while the other may pass freely over the clamping bolt. The arrangement is such that when the clamp has been assembled in position on the vertical and horizontal tubes the pins are arranged in their respective recesses at the outer ends of the limbs and the clamping bolt is passed therethrough whereupon the limbs of the U members may be drawn tightly on the horizontal tube by means of a nut $h$ screwed on to the clamping bolt. Moreover, the outer face $a^{22}$ $b^{22}$ of the recesses $a^2$ $b^2$ in the U members accommodating the horizontal tube $c$ are preferably inclined somewhat so as to have a camming action on the horizontal tube to force the same tightly into contact with the vertical tube as the clamp is tightened up.

If desired the clamping bolt $g$ may be formed with a plain portion $g'$ designed to give a rapid entry for the clamping nut, and obviating the complete removal of the nut from the bolt.

It will be seen that by means of the arrangement described I secure a large area of clamping pressure for both the horizontal and the vertical tubes and since the "grip" is positioned outside the two tubes there is no danger of penetration by, or other damage to the tubes.

In some cases it may be desired to clamp two tubes together which are disposed parallel to one another as shown at $c'$ $d'$ in Figures 3 and 4 and my improved form of clamp lends itself readily to such an arrangement by providing the pins above referred to with suitably shaped parts e' f' on their inner surfaces designed to contact the outermost c' of the two tubes when the clamp is tightened in position.

The invention is not to be limited to the precise shape of U-shaped members nor to any method by which the same are formed or clamped together and when necessary or desirable one of the members may be formed with a threaded aperture designed to take a set screw i which may be passed through into contact with one of the tubes so as temporarily to hold the clamp in position thereon while the second tube is being assembled in place.

I claim:

1. A clamp into which two tubes may be inserted for the purpose of clamping them together comprising two pivoted members, means for engaging the ends of the respective members remote from the pivot and drawing them together with the tubes between said means and the pivotal axis, and cam acting surfaces on said pivoted members for engaging at least one of said tubes in such a manner that when the ends of the pivoted members are drawn together pressure is exerted on said one tube so as to force it in a direction substantially at right angles to the direction of drawing together of the ends of the members, and thereby to clamp it to the other tube.

2. A clamp for securing two tubes together comprising two U-shaped members pivoted together at the closed ends so that the pivotal axis is parallel to the plane of each U, a supporting surface on the inside of the closed end of each U-shaped member whereby a tube may extend between the limbs of both members and rest against these supporting surfaces, a further supporting surface adjacent the open ends of each of the two U-shaped members, the distance between said further supporting surfaces and the tube being sufficient to allow of insertion of a second tube between said further supporting surfaces and the first tube, and means for engaging the open ends of the two U-shaped members and drawing them together with the tubes between said means and the pivotal axis whereby to clamp the two tubes between the first supporting surfaces and the further supporting surfaces.

3. A clamp for securing two tubes together comprising two U-shaped members pivoted together at the closed ends so that the pivotal axis is parallel to the plane of each U, a supporting surface on the inside of the closed end of each U-shaped member whereby a tube may extend between the limbs of both members and rest against these supporting surfaces, a further supporting surface adjacent the open ends of each of the two U-shaped members, the distance between said further supporting surfaces and the tube being sufficient to allow of insertion of a second tube between the two U-shaped members and between said further supporting surfaces and the first tube, and means for engaging the open ends of the two U-shaped members and drawing them together with the tubes between said means and the pivotal axis whereby to clamp the two tubes between the first supporting surfaces and the further supporting surfaces.

4. A clamp for securing two tubes together in parallel or at right angles comprising two U-shaped members pivoted together at the closed ends so that the pivotal axis is parallel to the plane of each U, a supporting surface on the inside of the closed end of each U-shaped member whereby a tube may extend between the limbs of both members and rest against these supporting surfaces, a further supporting surface adjacent the open ends of each of the two U-shaped members, the distance between said further supporting surfaces and the tube being sufficient to allow of insertion of a second tube between the limbs of each of the two U-shaped members and between said further supporting surfaces and the first tube, said further supporting surfaces acting when the ends of the U-shaped members are drawn together to support the second tube to effect clamping of the two tubes together, cam acting surfaces on the adjacent ends of said respective U-shaped members for engaging the second tube when inserted in an alternative position between the U-shaped members, parallel to the pivotal axis and acting when the ends of the U-shape members are drawn together to exert pressure on the second tube so as to force it in a direction substantially at right angles to the direction of drawing together of the ends of the U-shaped members and towards the pivotal axis and thereby to clamp it to the first tube, and means for engaging the open ends of the two U-shaped members and drawing them together with the tubes between said means and the pivotal axis.

ARCHIBALD ALFRED HOBBS.

REFERENCES CITED

The following references are of record in the file of this patent:

UNITED STATES PATENTS

| Number | Name | Date |
|---|---|---|
| 575,779 | Homan | Jan. 26, 1897 |
| 625,032 | Homan | May 16, 1899 |
| 2,280,509 | Cheron | Apr. 21, 1942 |

FOREIGN PATENTS

| Number | Country | Date |
|---|---|---|
| 231,230 | Great Britain | Mar. 23, 1925 |
| 649,790 | Germany | Sept. 2, 1937 |